United States Patent
Liu et al.

(10) Patent No.: US 10,081,728 B2
(45) Date of Patent: Sep. 25, 2018

(54) RESIN COMPOSITION AND USES OF THE SAME

(71) Applicant: TAIWAN UNION TECHNOLOGY CORPORATION, Chupei (TW)

(72) Inventors: Kai-Lun Liu, Chupei (TW); Hsien-Te Chen, Chupei (TW); Chih-Wei Liao, Chupei (TW)

(73) Assignee: TAIWAN UNION TECHNOLOGY CORPORATION, Chupei (TW)

( * ) Notice: Subject to any disclaimer, the term of this patent is extended or adjusted under 35 U.S.C. 154(b) by 598 days.

(21) Appl. No.: 13/679,173

(22) Filed: Nov. 16, 2012

(65) Prior Publication Data

US 2014/0044973 A1    Feb. 13, 2014

(30) Foreign Application Priority Data

Aug. 13, 2012  (TW) .............. 101129183 A

(51) Int. Cl.

| | |
|---|---|
| *C08L 63/00* | (2006.01) |
| *C08K 3/22* | (2006.01) |
| *B32B 15/092* | (2006.01) |
| *B32B 27/38* | (2006.01) |
| *B32B 15/14* | (2006.01) |
| *B32B 15/20* | (2006.01) |
| *B82Y 30/00* | (2011.01) |

(52) U.S. Cl.
CPC ............ *C08L 63/00* (2013.01); *B32B 15/092* (2013.01); *B32B 15/14* (2013.01); *B32B 15/20* (2013.01); *B32B 27/38* (2013.01); *C08K 3/22* (2013.01); *B32B 2262/101* (2013.01); *B32B 2307/536* (2013.01); *B32B 2457/08* (2013.01); *B82Y 30/00* (2013.01); *C08K 2003/2296* (2013.01); *C08K 2201/003* (2013.01); *C08K 2201/009* (2013.01); *Y10S 977/773* (2013.01); *Y10T 428/31529* (2015.04)

(58) Field of Classification Search
None
See application file for complete search history.

(56) References Cited

U.S. PATENT DOCUMENTS

| | | | |
|---|---|---|---|
| 4,798,762 A | 1/1989 | Okada et al. | |
| 6,632,511 B2 | 10/2003 | Zhang | |
| 2003/0197159 A1 | 10/2003 | Kinose et al. | |
| 2010/0048789 A1* | 2/2010 | Shieh et al. | 524/404 |
| 2010/0092764 A1* | 4/2010 | Chung | B32B 15/14 |
| | | | 428/331 |

FOREIGN PATENT DOCUMENTS

WO    2010078688    7/2010

* cited by examiner

*Primary Examiner* — Cheng Yuan Huang
(74) *Attorney, Agent, or Firm* — Greer, Burns & Crain, Ltd.

(57) ABSTRACT

A resin composition is provided. The resin composition comprises an epoxy resin, a zinc oxide powder and a hardener, wherein the zinc oxide powder has a Mohs hardness ranging from about 4 to about 5 and a diameter ranging from about 0.1 μm to about 50 μm, and the amount of the zinc oxide powder is more than 0.5 parts by weight and less than 10 parts by weight per 100 parts by weight of the epoxy resin.

6 Claims, 1 Drawing Sheet

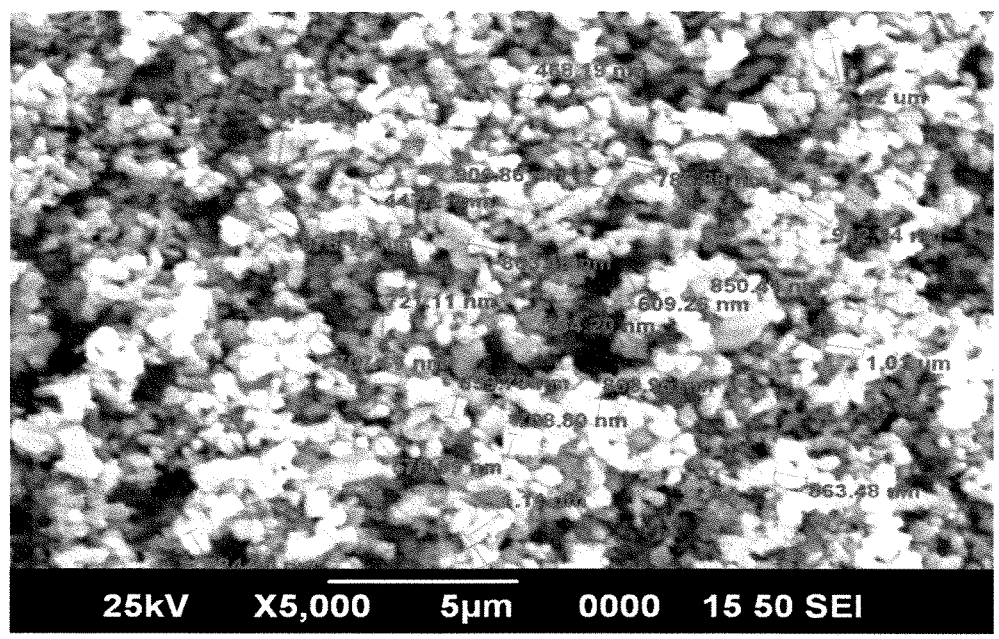

RESIN COMPOSITION AND USES OF THE SAME

This application claims priority to Taiwan Patent Application No. 101129183 filed on Aug. 13, 2012.

CROSS-REFERENCES TO RELATED APPLICATIONS

Not applicable.

BACKGROUND OF THE INVENTION

Field of the Invention

The present invention relates to a resin composition. Specifically, the present invention relates to a resin composition comprising a zinc oxide powder, and a prepreg and laminate prepared using the same.

Descriptions of the Related Art

Printed circuit boards are circuit substrates that are used for electronic devices to load other electronic components and to electrically connect the components to provide a stable circuit working environment. Thus, printed circuit boards require high thermal resistance, size stability, solder resistance, electrical properties, processability, etc. With the industrial development, the requirements for printed circuit boards in communication and computing electronic products (such as communication host, computer servers, etc.) and electrical products have increased. The aforementioned printed circuit boards usually have a multi-layered structure, and can be provided using the following methods: immersing a reinforcing material (e.g. glass fiber fabric) into a resin (e.g. epoxy resin); curing the immersed glass fiber fabric into a half-hardened state (i.e. B-stage) to obtain a prepreg; subsequently, superimposing the expected layers of the prepregs and superimposing a metal foil on at least one external surface of the superimposed prepregs to provide a superimposed object; hot-pressing the superimposed object (i.e. C-stage) to obtain a metal clad laminate; etching the metal foil on the surface of the metal clad laminate to form a defined circuit pattern; and finally, digging a plurality of holes on the metal clad laminate and plating these holes with a conductive material to form via holes to accomplish the preparation of the printed circuit board.

However, preparing printed circuit boards with multi-layered structures may lead to problems, such as bubbles in the resin and differences in junctional adhesion between different superimposed layers, which result in cracks or even popcorn condition (i.e., poor solder resistance) in the prepared printed circuit boards. Thus, spherical solid powders have been added to the resin composition to inhibit cracking in the boards. For example, U.S. Pat. No. 4,798,762 uses glass beads as spherical fillers to avoid rupture of the boards due to bending. However, the prepared boards have disadvantages that include poor size stability, poor electrical properties, etc. Furthermore, TW I264446 uses processed foaming microspheres as a filler to improve the properties of the laminate such as electrical properties, heat resistance, mechanical properties, etc. Nevertheless, the as-prepared laminates have limited application as the mass production cost of these foaming microspheres is high; and the Mohs hardness of the prepared laminate is so high that the pin of the drill will be rapidly worn during the drilling process of the laminate, and thus the lifetime of the drill is shortened.

In this regard, the present invention provides a resin composition for preparing a laminate, wherein the resin composition comprises a zinc oxide powder (preferably a spherical powder). The laminate prepared thereby is provided with outstanding properties such as size stability, heat resistance (high Td), electrical properties (low dielectric constant (Dk) and dissipation factor (Df)), etc. Cracking between the layers of the laminate can be advantageously inhibited (i.e., the laminate is provided with outstanding solder resistance).

SUMMARY OF THE INVENTION

An object of the present invention is to provide a resin composition, comprising: an epoxy resin; a zinc oxide powder with a Mohs hardness ranging from about 4 to about 5 and a diameter ranging from about 0.1 μm to about 50 μm; and a hardener, wherein the amount of the zinc oxide powder is about 0.5 parts by weight to less than 10 parts by weight per 100 parts by weight of the epoxy resin.

Another object of the present invention is to provide a prepreg which is prepared by immersing a substrate into the resin composition mentioned above and drying the immersed substrate.

Yet another object of the present invention is to provide a laminate comprising a synthetic layer and a metal layer, where the synthetic layer is made from the prepreg mentioned above.

To render the above objects, technical features and advantages of the present invention more apparent, the present invention will be described in detail with reference to some embodiments hereinafter.

BRIEF DESCRIPTION OF THE DRAWINGS

FIG. 1 shows a scanning electronic microscope (SEM) image of the zinc oxide additive in an embodiment of the resin composition of the present invention.

DESCRIPTION OF THE PREFERRED EMBODIMENT

The following will describe some embodiments of the present invention in detail. However, without departing from the spirit of the present invention, the present invention may be embodied in various embodiments without departing from the spirit of the present invention. The protection range of the present invention should not be limited to the embodiments described in the specification. In addition, unless it is additionally explained, the expressions "a," "the," or the like recited in the specification (especially in the claims) should include the singular and plural forms. Furthermore, unless it is additionally explained, while describing the constituents in the solution, mixture and composition in the specification, the amount of each constituent is counted based on the solid content, i.e., disregarding the weight of the solvent.

The resin composition of the present invention features using the zinc oxide powder as an additive of the resin composition. The laminate manufactured by using the resin composition of the present invention is provided with outstanding size stability, heat resistance (high Td), electrical properties (low Dk and Df), etc. Cracking between the layers of the laminate can be advantageously inhibited, i.e., the laminate is provided with outstanding solder resistance.

Specifically, the resin composition of the present invention comprises an epoxy resin, a zinc oxide powder and a hardener. The inventor found that the presence of zinc oxide can advantageously improve the physicochemical properties of the laminate such as size stability, thermal resistance, and electrical properties, etc. and inhibit the cracks between the layers of the laminate. Moreover, the zinc oxide powder used in the resin composition of the present invention has a Mohs hardness ranging from about 4 to about 5 such that the laminate prepared thereby has an appropriate Mohs hardness. Further, the zinc oxide powder used in the resin composition of the present invention has a diameter ranging from about 0.1 μm to about 50 μm, and preferably from about 0.4 μm to about 5 μm. If the zinc oxide powder has a diameter less than 0.1 μm, it may not be able to provide the desired effect of inhibiting cracks between the layers of the laminate; in addition, if the zinc oxide powder has a diameter more than 50 μm, the zinc oxide powder may not be uniformly dispersed in the resin composition, resulting in the variations on the properties of the prepared laminates. Such a large zinc oxide powder also tends to increase the wear on the drill during drilling. In some embodiments of the present invention, the zinc oxide power shown in FIG. 1 is adopted, which has a diameter ranging from about 0.4 μm to about 1.2 μm. It is believed that the wear on the drill can be further lowered by using spherical powder particles, and thus it is preferred that the zinc oxide power used in the resin composition of the present invention is a spherical zinc oxide powder.

In the resin composition of the present invention, the amount of zinc oxide powder ranges from about 0.5 parts by weight to less than about 10 parts by weight, and preferably ranges from about 2 parts by weight to about 8 parts by weight per 100 parts by weight of the epoxy resin. If the amount of zinc oxide powder is less than 0.5 parts by weight, the desired physicochemical properties (thermal resistance, size stability, crack inhibition of each layer) and the crack-inhibiting effect may not be obtained; and if the amount of the zinc oxide powder is more than 10 parts by weight, the electrical properties of the laminate will be negatively affected (i.e., Dk and Df will be raised) and the Mohs hardness of the laminate will be increased (which will worsen the wear on the drill).

The zinc oxide powder of the resin composition of the present invention can be prepared by any conventional direct or indirect process. The zinc oxide powder prepared by the indirect process has a high degree of purity and a diameter ranging from about 0.1 μm to about 10 μm, and thus is especially suitable for the resin composition of the present invention. For example, but not limited thereto, the zinc oxide powder can be obtained by providing a zinc ingot or zinc dross from minerals by a smelting process, heating the zinc ingot or zinc dross to a temperature of 1000° C. in a graphite crucible to form zinc vapor, blowing air thereinto to form zinc oxide, and cooling the obtained mixture.

In the resin composition of the present invention, the epoxy resin contained is a resin with at least two epoxy groups in the molecular structure, such as a bromine-containing or non-halogen bifunctional or multiple bifunctional epoxy resin, a phenol novolac epoxy resin, a phosphorus-containing epoxy resin, etc. In some embodiments of the present invention, a bromine-containing epoxy resin or a phosphorus-containing epoxy resin is illustrated as the epoxy resin.

In the resin composition of the present invention, a hardener can promote or adjust the bridging among the molecules to thereby obtain a network structure. The types of hardener are not particularly limited and can be any hardener which can provide the desired hardening effect. For example, but not limited thereto, the hardener used in the resin composition of the present invention can be a conventional hardener selected from a group consisting of dicyandiamide (Dicy), 4,4'-diaminodiphenyl sulfone (DDS), phenol novolac (PN), styrene maleic anhydride copolymer (SMA), benzoxazine and its ring-opening polymer, bismaleimide, triazine and combinations thereof. In some embodiments of the present invention, PN or the combination of Dicy and SMA is illustrated as the hardener.

In the resin composition of the present invention, the weight ratio of the epoxy resin and the hardener can be adjusted depending on the users' needs. Considering the desired hardening effect may not be provided if the weight ratio of the hardener is too low and will result in poor physicochemical properties of the prepared material; generally, the amount of the hardener ranges from about 2 parts by weight to about 150 parts by weight, and preferably ranges from about 2 parts by weight to about 60 parts by weight, per 100 parts by weight of the epoxy resin, but is not limited thereto.

The resin composition of the present invention may optionally further comprise other additives, such as a hardening promoter, a filler, a silane coupling agent, a dispersing agent, a flexibilizer, a retardant or a releasing agent, and these additives can be used alone or in combination forms. For example, a hardening promoter selected from the group consisting of imidazole, 2-methyl-imidazole (2MI), 2-ethyl-4-methyl-imidazole (2E4MI), 2-phenyl-imidazole (2PI) and combinations thereof, but not limited thereto, may be added to improve the hardening effect. Also, a filler selected from the group consisting of silica, glass powder, talcum, kaolin, pryan, mica and combinations thereof may be added to improve the properties of the epoxy resin such as the processability, flammability, heat resistance and moisture resistance. Alternatively, a silane coupling agent may be further added in the resin composition to improve the cross-linking between the inorganic material and the resin. The amount of additives can be adjusted depending on the users' needs based on the disclosure of the specification, and is not particularly limited.

The resin composition of the present invention may be prepared into a varnish by evenly mixing the epoxy resin, the zinc oxide powder and the hardener through a stirrer; and dissolving or dispersing the mixture into a solvent, for subsequent applications. The solvent here can be any solvent which can dissolve (or disperse) but not react with the components of the resin composition of the present invention. For example, the solvent may be selected from a group consisting of propylene glycol monomethyl ether (PM), propylene glycol monomethyl ether acetate (PMA), methyl ethyl ketone (MEK), cyclohexanone, toluene, γ-butyrolactone, butanone, acetone, xylene, methyl isobutyl ketone, N,N-dimethyl formamide (DMF), N,N-dimethyl acetamide (DMAc), N-methyl-pyrolidone (NMP), and combinations thereof, but is not limited thereto. The amount of the solvent is not particularly limited to a certain amount as long as the components of the resin composition can be evenly mixed. In some embodiments of the present invention, a mixture consisting of PM, PMA and MEK is used as the solvent, and the amount of the solvent is about 60 parts by weight per 100 parts by weight of the epoxy resin.

The present invention further provides a prepreg which is obtained by immersing a substrate (a reinforcing material) into the resin composition of the present invention to provide an immersed substrate and drying the immersed substrate. A conventional reinforcing material includes a glass fiber cloth (a glass fiber fabric, a glass fiber paper, a glass fiber mat, etc.), a kraft paper, a short fiber cotton paper, a nature fiber cloth, an organic fiber cloth, etc. In some embodiments of the present invention, 7628 glass fiber cloths are illustrated as the reinforcing material, which are heated and dried at 180° C. for 2 to 10 minutes (B-stage) to provide half-hardened prepregs.

The abovementioned prepregs can be used in producing laminates. Therefore, the present invention further provides a laminate comprising a synthetic layer and a metal layer, wherein the synthetic layer is made from the above prepregs. The laminate may be prepared by following process: superimposing a plurality of prepregs and superimposing a metal foil (such as copper foil) on at least one external surface of the superimposed prepregs to provide a superimposed object; performing a hot-pressing operation onto the object to obtain the laminate. Moreover, a printed circuit board can be obtained by making a pattern on the metal foil of the laminate.

The present invention will be further illustrated by the embodiments hereinafter, wherein the measuring instruments and methods are respectively as follows:

[Gel Time Test]

The method for testing gel time comprises the following steps: placing 0.2 g of resin composition sample on a hot plate at about 171° C. and subjecting the sample to form a disc (2 cm$^2$ in area); and calculating the time required for the sample to not adhere to the stirring rod used for stirring the sample or until the sample becomes cured. The required time is regarded as the gel time.

[H$_2$O Absorption Test]

The H$_2$O absorption of the laminate is tested by the pressure cooker test (PCT), i.e., subjecting the laminate into a pressure container (121° C., 100% R.H. and 1.2 atm) for 2 hours.

[Solder Resistance Test]

The solder resistance test is carried out by immersing the dried laminate in a solder bath at 288° C., observing and recording the immersed time at which the popcorn condition (e.g. observing the laminate whether there is any defect such as delamination and expansion) of the laminate occurred.

[Peeling Strength Test]

Peeling strength refers to the bonding strength between the metal foil and laminated prepreg, which is usually expressed by the force required for vertically peeling the clad copper foil with a width of ⅛ inch from the surface of the laminated prepreg.

[Glass Transition Temperature Test]

Glass transition temperature (Tg) is measured by using a Differential Scanning calorimeter (DSC), wherein the measuring methods are IPC-TM-650.2.4.25C and 24C testing method of the Institute for Interconnecting and Packaging Electronic Circuits (IPC).

[Thermal Decomposition Temperature Test]

The thermal decomposition temperature test is carried out by measuring the mass loss of the sample with a thermogravimetric analyzer (TGA). The temperature where the weight loss is up to 5% is regarded as the thermal decomposition temperature.

[Coefficient of Thermal Expansion (CTE) Test]

The z-axis expansion % of the sample (a laminate in the size of 3 mm$^2$) are tested by the thermal expansion analyzer of TA instrument company (model No.: TA 2940) between a temperature gap ranging from 50° C. to 260° C. (heating rate: 10° C./min).

[Dielectric Constant and Dissipation Factor Measurement]

Dk and Df are measured according to ASTM D150 under an operating frequency of 1 GHZ.

[Percentage of Wear on the Drill]

The percentage of wear on the drill is tested by drilling 800 holes on the laminate using a drill with a diameter of 0.3 mm, and quantified by observing the ratio of the worn area of the drill tip surface to the total cross-sectional area.

EXAMPLES

Preparation of the Resin Composition

Example 1

According to the ratio shown in Table 1, bromines-containing epoxy resin (DOW 19074), PN hardener, 2-methyl-imidazole (2MI), silane coupling agent and spherical zinc oxide powder with a diameter ranging from about 0.4 μm to about 1.5 μm (as shown in FIG. 1) were mixed at room temperature with a stirrer for about 60 minutes followed by adding PM, PMA and MEK. After stirring the resultant mixture at room temperature for about 120 minutes, resin composition 1 was obtained. The gel time of resin composition 1 was measured and the result is tabulated in Table 1.

Example 2

The preparation procedures of Example 1 were repeated to prepare resin composition 2, except that the amount of zinc oxide powder was adjusted to about 4 parts by weight, as shown in Table 1. The gel time of resin composition 2 was measured and the result is tabulated in Table 1.

Example 3

The preparation procedures of Example 1 were repeated to prepare resin composition 3, except that the amount of zinc oxide powder was adjusted to about 8 parts by weight, as shown in Table 1. The gel time of resin composition 3 was measured and the result is tabulated in Table 1.

Example 4

The preparation procedures of Example 2 were repeated to prepare resin composition 4, except that the PN hardener was replaced by a mixture of about 3 parts by weight of Dicy and about 25 parts by weight of SMA EF40, as shown in Table 1. The gel time of resin composition 4 was measured and the result is tabulated in Table 1.

Example 5

The preparation procedures of Example 2 were repeated to prepare resin composition 5, except that the bromine-containing epoxy resin was replaced by about 100 parts by weight of phosphorous-contained epoxy resin, as shown in Table 1. The gel time of resin composition 5 was measured and the result is tabulated in Table 1.

Comparative Example 1

The preparation procedures of Example 1 were repeated to prepare comparative resin composition 1, except that zinc oxide powder and silane coupling agent were not used, as shown in Table 1. The gel time of comparative resin composition 1 was measured and the result is tabulated in Table 1.

Comparative Example 2

The preparation procedures of Example 1 were repeated to prepare comparative resin composition 2, except that the amount of zinc oxide powder was adjusted to about 10 parts by weight, as shown in Table 1. The gel time of comparative resin composition 2 was measured and the result is tabulated in Table 1.

TABLE 1

| Composition (parts by weight) | | Example 1 | Example 2 | Example 3 | Example 4 | Example 5 | Comparative example 1 | Comparative example 2 |
|---|---|---|---|---|---|---|---|---|
| epoxy resin | bromine-containing epoxy resin | 100 | 100 | 100 | 100 | — | 100 | 100 |
| | phosphorous-containing epoxy resin | — | — | — | — | 100 | — | — |
| hardener | PN | 50 | 50 | 50 | — | 50 | 50 | 50 |
| | Dicy | — | — | — | 3 | — | — | — |
| | SMA | — | — | — | 25 | — | — | — |
| hardening promoter | 2MI | 0.05 | 0.05 | 0.05 | 0.05 | 0.05 | 0.05 | 0.05 |
| additive | silane coupling agent | 1.6 | 1.6 | 1.6 | 1.6 | 1.6 | — | 1.6 |
| filler | zinc oxide powder | 2 | 4 | 8 | 4 | 4 | 0 | 10 |
| | talcum powder | — | — | — | — | — | — | — |
| solvent | PM/PMA/MEK | 60 | 60 | 60 | 60 | 60 | 60 | 60 |
| property of the resin composition | gel time (sec) | 275 | 271 | 260 | 270 | 268 | 265 | 245 |

As shown in Table 1, the gel time of the resin composition can be regulated by adjusting the amount of the zinc oxide powder. Thus, the time required for using the resin composition to prepare prepregs and laminates can be reduced and the prepregs and laminates can be prepared more effectively and economically.

[Preparation of the Laminate]

The laminate was prepared using resin compositions of Examples 1 to 5 and comparative examples 1 and 2, respectively. In detail, one of these resin compositions was coated on 7628 glass fiber cloths by a roll coater. The coated 7628 glass fiber cloths were then placed in an oven and dried at 180° C. for 2 to 10 minutes to produce prepregs in a half-hardened state (resin content: about 42%). Eight pieces of the prepregs were superimposed and two sheets of copper foil (1 oz) were respectively superimposed on the two external surfaces of the superimposed prepregs to provide a superimposed object. A hot-pressing operation was performed on each of the prepared objects to provide laminates 1 to 5 (corresponding to resin composition 1 to 5) and comparative laminates 1 and 2 (corresponding to comparative resin compositions 1 and 2). Herein, the hot-pressing conditions are as follows: raising the temperature to 180° C. with a heating rate of 2.0° C./min, and hot-pressing for 60 minutes under the full pressure of 15 kg/cm² (initial pressure is 8 kg/cm²) at 180° C.

The $H_2O$ absorption, solder resistance, peeling strength, glass transition temperature (Tg), thermal decomposition temperature (Td), z-axis expansion percentage, dielectric constant (Dk), dissipation factor (Df), and percentage of wear on the drill of the laminates 1 to 5 and comparative laminates 1 and 2 were analyzed and the results are tabulated in Table.

TABLE 2

| Test items | unit | laminate 1 | laminate 2 | laminate 3 | laminate 4 | laminate 5 | comparative laminate 1 | comparative laminate 2 |
|---|---|---|---|---|---|---|---|---|
| $H_2O$ absorption | % | 0.46 | 0.45 | 0.47 | 0.43 | 0.56 | 0.51 | 0.42 |
| solder resistance | minute | >20 | >20 | >20 | >20 | >20 | 14 | >20 |
| peeling strength | pound/inch | 9.46 | 9.41 | 9.32 | 9.39 | 9.48 | 9.49 | 9.29 |
| glass transition temperature (Tg) | ° C. | 175 | 174 | 176 | 174 | 178 | 175 | 176 |
| thermal decomposition temperature (Td) | ° C. | 341 | 355 | 368 | 357 | 362 | 332 | 366 |
| z-axis expansion percentage | ppm/° C. | 3.8 | 3.6 | 3 | 3.4 | 3.5 | 4.6 | 3 |
| dielectric constant (Dk) @ 1 GHz | | 4.23 | 4.5 | 4.6 | 4.19 | 4.21 | 4.21 | 4.8 |
| dissipation factor (Df) @ 1 GHz | | 0.016 | 0.018 | 0.02 | 0.018 | 0.017 | 0.015 | 0.023 |
| percentage of wear on the drill | % | 25 | 30 | 30 | 30 | 30 | 10 | 35 |

In Table 2, as compared with the comparative laminate 1 manufactured by using the resin composition containing no zinc oxide powder, the laminates manufactured by using the resin composition of the present invention containing zinc oxide powder (laminates 1 to 5) had outstanding solder resistance (that is, the addition of zinc oxide powder, especially spherical zinc oxide, has a significant effect on inhibiting the cracks between the layers of the laminate); and outstanding heat resistance (high Td) and size stability (low z-axis expansion percentage). The extent of improvement increases with increasing the amount of zinc oxide powder, and such correlation is especially significant when using bromine-containing epoxy resin (Example 5). In addition, as shown in comparative example 2, if the ratio of the zinc oxide powder is too high, the electrical properties of the laminate will be disadvantageously affected and the percentage of wear on the drill is too high (higher than 30%) because of the increased Mohs hardness of the laminate.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A resin composition, comprising:
    an epoxy resin, which is a bromine-containing epoxy resin, a phosphorus-containing epoxy resin or a combination thereof;
    a zinc oxide powder having a Mohs hardness ranging from about 4 to about 5 and a diameter ranging from about 0.4 µm to about 1.5 µm; and
    a hardener selected from the group consisting of: dicyandiamide (Dicy), phenol novolac (PN), styrene maleic anhydride copolymer (SMA), and combinations thereof,
    wherein an amount of the zinc oxide powder is about 2 parts by weight to 4 parts by weight per 100 parts by weight of the epoxy resin, and an amount of the hardener is about 28 parts by weight to about 50 parts by weight per 100 parts by weight of the epoxy resin.

2. The resin composition of claim 1, which further comprises an additive selected from the group consisting of a hardening promoter, a filler, a silane coupling agent, a dispersing agent, a flexibilizer, a retardant, a mold release agent and combinations thereof.

3. The resin composition of claim 2, wherein the hardening promoter is selected from the group consisting of 2-methyl-imidazole (2MI), 2-ethyl-4-methyl-imidazole (2E4MI), 2-phenyl-imidazole (2PI) and combinations thereof.

4. The resin composition of claim 2, wherein the filler is selected from the group consisting of silica, glass powder, talcum, kaolin, pryan, mica and combinations thereof.

5. A prepreg, which is prepared by immersing a substrate into the resin composition of claim 1 to provide an immersed substrate and drying the immersed substrate.

6. A laminate comprising a synthetic layer and a metal layer, wherein the synthetic layer is made from the prepreg of claim 5.

* * * * *